United States Patent
Kim et al.

(10) Patent No.: US 10,411,283 B2
(45) Date of Patent: Sep. 10, 2019

(54) POLYMER ELECTROLYTE MEMBRANE

(71) Applicant: LG CHEM, LTD., Seoul (KR)

(72) Inventors: Youngjea Kim, Daejeon (KR); Yong Jin Jang, Daejeon (KR); Joong Jin Han, Daejeon (KR); Esder Kang, Daejeon (KR); Yunah Yu, Daejeon (KR)

(73) Assignee: LG CHEM, LTD., Seoul (KR)

( * ) Notice: Subject to any disclaimer, the term of this patent is extended or adjusted under 35 U.S.C. 154(b) by 54 days.

(21) Appl. No.: 15/531,584

(22) PCT Filed: Dec. 4, 2015

(86) PCT No.: PCT/KR2015/013203
§ 371 (c)(1),
(2) Date: May 30, 2017

(87) PCT Pub. No.: WO2016/089153
PCT Pub. Date: Jun. 9, 2016

(65) Prior Publication Data
US 2018/0261868 A1    Sep. 13, 2018

(30) Foreign Application Priority Data

Dec. 4, 2014 (KR) .................. 10-2014-0173137
Dec. 4, 2014 (KR) .................. 10-2014-0173142

(Continued)

(51) Int. Cl.
*H01B 1/12*    (2006.01)
*H01M 8/1032*    (2016.01)
(Continued)

(52) U.S. Cl.
CPC .......... *H01M 8/1032* (2013.01); *B01J 39/19* (2017.01); *B01J 47/12* (2013.01); *C08G 61/02* (2013.01);
(Continued)

(58) Field of Classification Search
CPC . H01M 2008/1095; H01M 2300/0082; H01M 8/1023; H01M 8/1025;
(Continued)

(56) References Cited

U.S. PATENT DOCUMENTS 7,807,759 B2   10/2010 Shin et al.
9,136,551 B2    9/2015 Kwon et al.
(Continued)

FOREIGN PATENT DOCUMENTS

EP   2270104 A1   1/2011
JP   2003-234014 A   8/2003
(Continued)

OTHER PUBLICATIONS

European Search Report for Appl. No. 15865952.4 dated May 29, 2018.
(Continued)

*Primary Examiner* — Mark Kopec
*Assistant Examiner* — Jaison P Thomas
(74) *Attorney, Agent, or Firm* — Birch, Stewart, Kolasch & Birch, LLP

(57)    ABSTRACT

The present specification relates to a polymer electrolyte membrane including two types of polymers.

17 Claims, 2 Drawing Sheets

(30) Foreign Application Priority Data

Dec. 4, 2014 (KR) ........................ 10-2014-0173157
Dec. 4, 2014 (KR) ........................ 10-2014-0173178

(51) Int. Cl.

| | |
|---|---|
| H01M 8/1004 | (2016.01) |
| H01M 8/1027 | (2016.01) |
| C08J 5/22 | (2006.01) |
| C08G 61/02 | (2006.01) |
| C08G 61/12 | (2006.01) |
| C08L 65/00 | (2006.01) |
| C08G 81/00 | (2006.01) |
| C08G 75/02 | (2016.01) |
| C08G 75/20 | (2016.01) |
| H01M 8/1023 | (2016.01) |
| H01M 8/18 | (2006.01) |
| B01J 39/19 | (2017.01) |
| B01J 47/12 | (2017.01) |
| C08G 65/40 | (2006.01) |
| H01M 8/1025 | (2016.01) |
| H01M 8/1039 | (2016.01) |
| H01M 8/1053 | (2016.01) |
| H01M 8/1018 | (2016.01) |

(52) U.S. Cl.
CPC ......... *C08G 61/12* (2013.01); *C08G 65/4056* (2013.01); *C08G 75/02* (2013.01); *C08G 75/20* (2013.01); *C08G 81/00* (2013.01); *C08J 5/22* (2013.01); *C08J 5/2262* (2013.01); *C08L 65/00* (2013.01); *H01B 1/128* (2013.01); *H01M 8/1004* (2013.01); *H01M 8/1023* (2013.01); *H01M 8/1025* (2013.01); *H01M 8/1027* (2013.01); *H01M 8/1039* (2013.01); *H01M 8/1053* (2013.01); *H01M 8/188* (2013.01); *C08G 2650/40* (2013.01); *C08G 2650/48* (2013.01); *C08G 2650/64* (2013.01); *C08J 2371/10* (2013.01); *H01M 2008/1095* (2013.01); *H01M 2300/0082* (2013.01); *Y02E 60/528* (2013.01)

(58) Field of Classification Search
CPC ............. H01M 8/1032; H01M 8/1039; H01M 8/1053; H01M 8/188; H01M 8/1004; H01M 8/1027; B01J 39/19; B01J 47/12; C08G 2650/40; C08G 2650/48; C08G 2650/64; C08G 61/02; C08G 61/12; C08G 65/4056; C08G 75/02; C08G 75/20; C08G 81/00; C08J 2371/10; C08J 5/22; C08J 5/2262; C08L 65/00; Y02E 60/528; H01B 1/128
See application file for complete search history.

(56) References Cited

U.S. PATENT DOCUMENTS

| | | |
|---|---|---|
| 2004/0048129 A1 | 3/2004 | Taft, III et al. |
| 2005/0031924 A1 | 2/2005 | Shirono et al. |
| 2005/0053818 A1 | 3/2005 | St-Arnaud et al. |
| 2006/0188768 A1 | 8/2006 | Kanaoka et al. |
| 2008/0114149 A1* | 5/2008 | Moore ............... C08G 65/4025 528/293 |
| 2008/0114183 A1 | 5/2008 | Moore et al. |
| 2009/0123641 A1 | 5/2009 | Hadj Romdhane et al. |
| 2009/0163692 A1* | 6/2009 | Moore .................. C07C 317/14 528/174 |
| 2009/0169950 A1 | 7/2009 | Prugh et al. |
| 2010/0167100 A1 | 7/2010 | Moore et al. |
| 2011/0020731 A1* | 1/2011 | Yoshimura ............. C08G 61/08 429/483 |
| 2011/0059385 A1 | 3/2011 | Kim et al. |
| 2011/0136040 A1 | 6/2011 | Hwang et al. |
| 2012/0028138 A1 | 2/2012 | Lee et al. |
| 2012/0052347 A1 | 3/2012 | Wilson et al. |
| 2012/0135333 A1 | 5/2012 | Meredith, III et al. |
| 2014/0030573 A1 | 1/2014 | Esswein et al. |
| 2014/0065512 A1* | 3/2014 | Kwon .................. C07C 309/10 429/480 |
| 2014/0227627 A1 | 8/2014 | He et al. |
| 2016/0260994 A1* | 9/2016 | Kong ...................... H01M 8/20 |
| 2016/0380297 A1 | 12/2016 | Kong et al. |
| 2017/0338504 A1 | 11/2017 | Kang et al. |

FOREIGN PATENT DOCUMENTS

| | | |
|---|---|---|
| JP | 2004-335231 A | 11/2004 |
| JP | 2006-228628 A | 8/2006 |
| JP | 2009-256654 A | 11/2009 |
| JP | 2011-57982 A | 3/2011 |
| JP | 2012-149259 A | 8/2012 |
| JP | 2013-218868 A | 10/2013 |
| KR | 10-2003-0076057 A | 9/2003 |
| KR | 10-2006-0071690 A | 6/2006 |
| KR | 10-2006-0100148 A | 9/2006 |
| KR | 10-2010-0076902 A | 7/2010 |
| KR | 10-2010-0084237 A | 7/2010 |
| KR | 10-2011-0063175 A | 6/2011 |
| KR | 10-2013-0062252 A | 6/2013 |
| KR | 20150048639 A * | 5/2015 ............. H01M 8/20 |
| WO | WO 2006/132144 A1 | 12/2006 |

OTHER PUBLICATIONS

U.S. Office Action for U.S. Appl. No. 15/531,702, dated Sep. 7, 2018.
Arvai et al., "New aryl-containing fluorinated sulfonic acids and their ammonium salts, useful as electrolytes for fuel cells or ionic liquids", Journal of Fluorine Chemistry, vol. 129, 2008, pp. 1029-1035.
International Search Report issued in PCT/KR2015/013202 dated Apr. 6, 2016.
International Search Report issued in PCT/KR2015/013203 dated Apr. 6, 2016.
International Search Report issued in PCT/KR2015/013206 dated Apr. 7, 2016.
International Search Report issued in PCT/KR2015/013209 dated Apr. 1, 2016.
International Search Report issued in PCT/KR2015/013213 dated May 19, 2016.
International Search Report issued in PCT/KR2015/013218 dated Apr. 8, 2016.
Paillard et al., "Electrochemical investigation of polymer electrolytes based on lithium 2-(phenylsulfanyl)-1,1,2,2-tetrafluoroethansulfonate", Electrochimica Acta, vol. 53, 2007, pp. 1439-1443.
Paillard et al., "Polymer electrolytes based on new aryl-containing lithium perfluorosulfonates", Journal of Fluorine Chemistry, vol. 134, 2012, pp. 72-76.
Toulgoat et al., "An Efficient Preparation of New Sulfonyl Fluorides and Lithium Sulfonates", The Journal of Organic Chemistry, vol. 72, No. 24, 2007, pp. 9046-9052.
Xu et al., "Highly Conductive Aromatic Ionomers with Perfluorosulfonic Acid Side Chains for Elevated Temperature Fuel Cells", Macromolecules, vol. 44, 2011, pp. 4605-4609.
Extended European Search Report dated Mar. 28, 2018 for Application No. 15865281.8.
Extended European Search Report dated Mar. 28, 2018 for Application No. 15866009.2.
Extended European Search Report dated Mar. 28, 2018 for Application No. 15866198.3.

(56) References Cited

OTHER PUBLICATIONS

U.S. Office Action for U.S. Appl. No. 15/531,670, dated Feb. 1, 2019.
U.S. Office Action dated Apr. 12, 2019 for U.S. Appl. No. 15/531,596.

* cited by examiner

[FIG. 1]
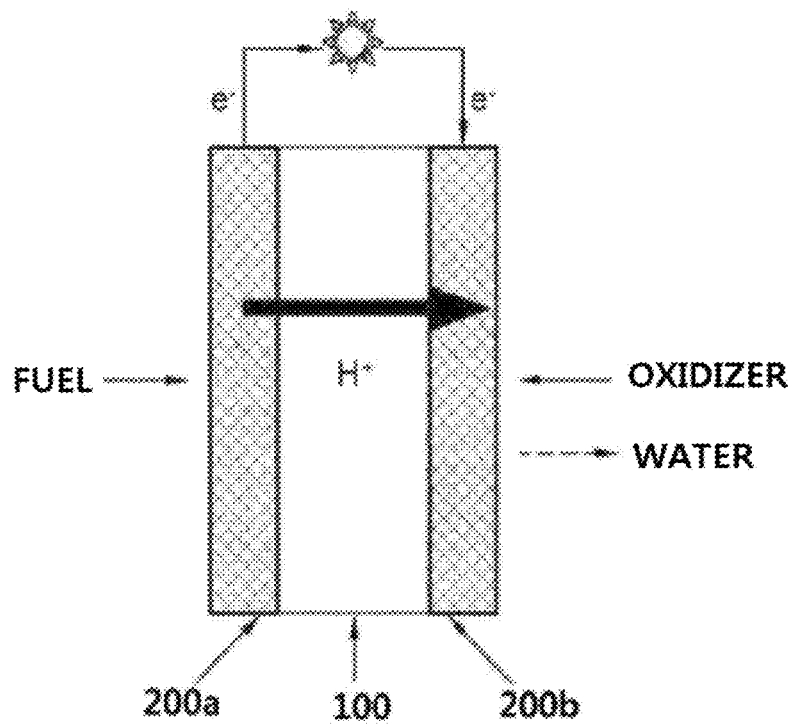
[FIG. 2]
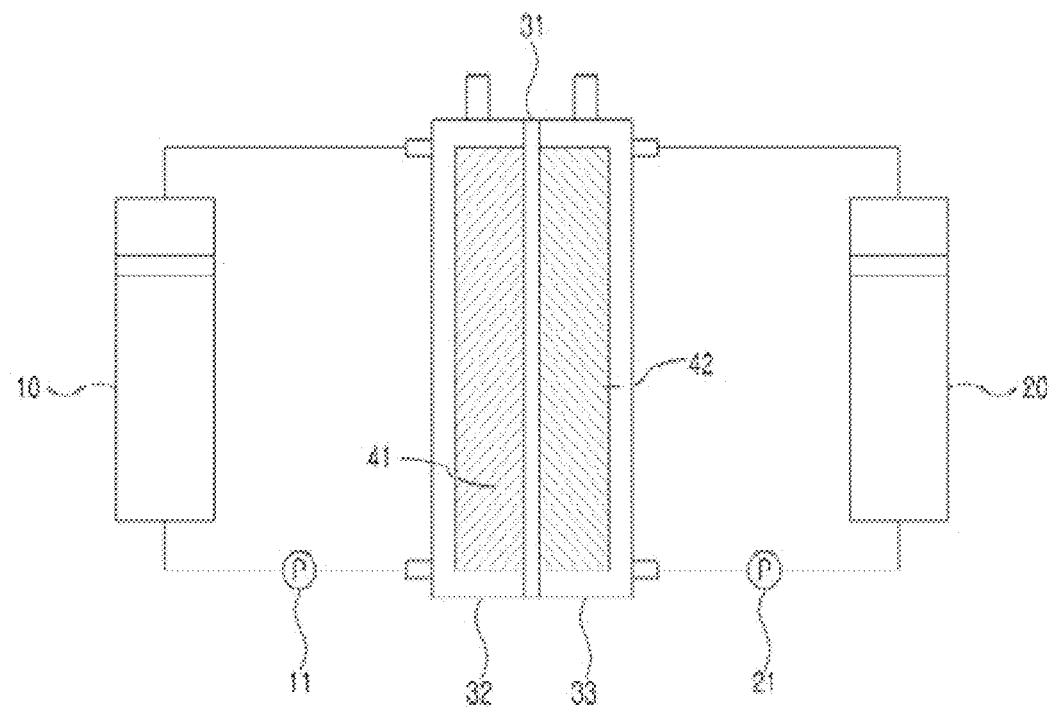

[FIG. 3]
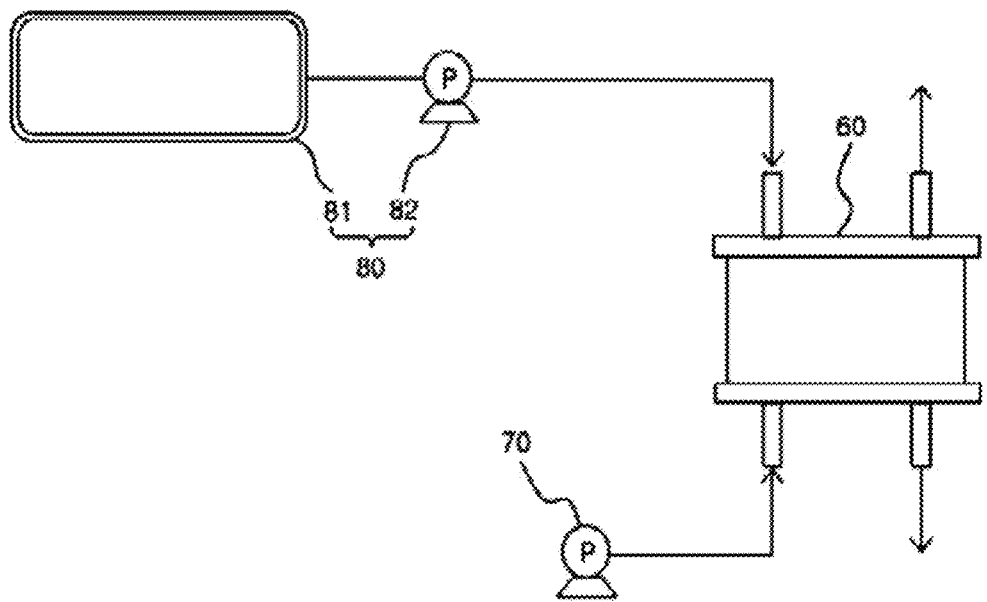
[FIG. 4]
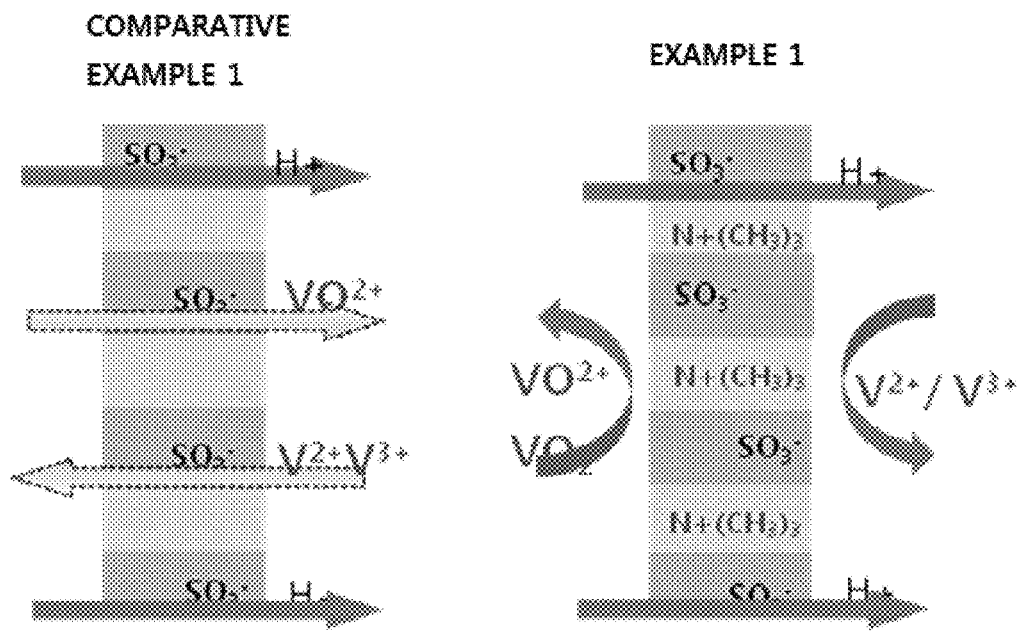

POLYMER ELECTROLYTE MEMBRANE

TECHNICAL FIELD

The present specification claims priority to and the benefits of Korean Patent Application Nos. 10-2014-0173157, 10-2014-0173178, 10-2014-0173137 and 10-2014-0173142 filed with the Korean Intellectual Property Office on Dec. 4, 2014, the entire contents of which are incorporated herein by reference.

The present specification relates to a polymer electrolyte membrane.

BACKGROUND ART

A fuel cell is an energy conversion device directly converting chemical energy of fuel into electric energy. In other words, a fuel cell employs a power generation method utilizing a fuel gas and an oxidizer, and using electrons generated during the oxidation and reduction reactions thereof to produce power. A membrane-electrode assembly (MEA) of a fuel cell is a part where an electrochemical reaction of hydrogen and oxygen occurs, and is formed with a cathode, an anode and an electrolyte membrane, that is, an ion conductive electrolyte membrane.

A redox flow battery (oxidation-reduction flow battery) is a system charged and discharged by active materials included in a liquid electrolyte being oxidized and reduced, and is an electrochemical storage device directly storing chemical energy of the active materials as electric energy. A unit cell of the redox flow battery includes an electrode, an electrolyte and an ion-exchange membrane (electrolyte membrane).

Due to their high energy efficiency and environmental friendly properties of low contaminant emissions, fuel cells and redox flow batteries have been researched and developed as a next generation energy source.

A core constituent in a fuel cell and a redox flow battery is a polymer electrolyte membrane capable of cation exchange, and properties of 1) excellent proton conductivity, 2) preventing an electrolyte crossover, 3) high chemical resistance, 4) strengthening mechanical properties and/or 4) low swelling ratio are favorably required. The polymer electrolyte membrane is divided into fluorine-based, partial fluorine-based, hydrocarbon-based and the like, and, by having a fluorine-based main chain, the partial fluorine-based polymer electrolyte membrane has advantages of exhibiting excellent physical and chemical stability and high thermal stability. In addition, in the partial fluorine-based polymer electrolyte membrane, a cation transfer functional group is attached at the end of the fluorine-based chain as in the fluorine-based polymer electrolyte membrane, and therefore, advantages of both a hydrocarbon-based polymer electrolyte membrane and a fluorine-based polymer electrolyte membrane are capable of being obtained.

However, a partial fluorine-based polymer electrolyte membrane has a problem in that cation conductivity is relatively low since micro-phase separation and aggregation of a cation transfer functional group are not effectively controlled. Accordingly, researches have been progressed in the direction of securing high cation conductivity through controlling distribution and micro-phase separation of a sulfonic acid group.

PRIOR ART DOCUMENTS

Patent Documents

Korean Patent Application Laid-Open Publication No. 2003-0076057

DISCLOSURE

Technical Problem

The present specification is directed to providing a polymer electrolyte membrane having excellent durability and acid resistance.

Technical Solution

One embodiment of the present specification provides a polymer electrolyte membrane including a polymer including a unit represented by the following Chemical Formula 1; and a polymer including at least one cationic side chain.

[Chemical Formula 1]

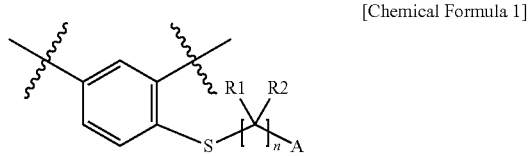

A is $-SO_3H$, $-SO_3^-M^+$, $-COOH$, $-COO^-M^+$, $-PO_3H_2$, $-PO_3H^-M^+$, $-PO_3^{2-}2M^+$, $-O(CF_2)_mSO_3H$, $-O(CF_2)_mSO_3^-M^+$, $-O(CF_2)_mCOOH$, $-O(CF_2)_mCOO^-M^+$, $-O(CF_2)_mPO_3H_2$, $-(CF_2)_mPO_3H^-M^+$ or $-O(CF_2)_mPO_3^{2-}2M^+$, m is an integer of 1 to 6, M is a group 1 element, R1 and R2 are the same as or different from each other, and each independently a halogen group, n is an integer of 1 to 10, and when m and n are 2 or greater, two or more structures in the parentheses are the same as or different from each other.

Another embodiment of the present specification provides a membrane-electrode assembly including an anode; a cathode; and the polymer electrolyte membrane described above provided between the anode and the cathode.

Still another embodiment of the present specification provides a polymer electrolyte-type fuel cell including two or more of the membrane-electrode assemblies; a stack including a bipolar plate provided between the membrane-electrode assemblies; a fuel supplying unit supplying fuel to the stack; and an oxidizer supplying unit supplying an oxidizer to the stack.

Lastly, yet another embodiment of the present specification provides a redox flow battery including a positive electrode cell including a positive electrode and a positive electrode liquid electrolyte; a negative electrode cell including a negative electrode and a negative electrode liquid electrolyte; and the polymer electrolyte membrane described above provided between the positive electrode cell and the negative electrode cell.

Advantageous Effects

A polymer electrolyte membrane including a block polymer according to one embodiment of the present specification readily forms a hydrophilic-hydrophobic phase separation structure.

In addition, by controlling the phase separation structure, the polymer electrolyte membrane efficiently forms a hydrophilic channel in the polymer electrolyte membrane.

Additionally, the polymer electrolyte membrane including a block polymer according to one embodiment of the present specification is capable of exhibiting advantages of both a cation polymer electrolyte membrane and an anion polymer electrolyte membrane.

The polymer electrolyte membrane according to one embodiment of the present specification has excellent proton conductivity. As a result, high performance of a fuel cell and/or a redox flow battery including the same is obtained.

In addition, a polymer electrolyte-type fuel cell including the polymer electrolyte membrane according to one embodiment of the present specification is capable of preventing a gas crossover, and enhancing ion conductivity even under a low humidity condition.

Additionally, a redox flow battery including the polymer electrolyte membrane according to one embodiment of the present specification is capable of reducing a vanadium ion crossover.

DESCRIPTION OF DRAWINGS

FIG. 1 is a schematic diagram showing a principle of electricity generation of a fuel cell.

FIG. 2 is a diagram schematically illustrating one embodiment of a redox flow battery.

FIG. 3 is a diagram schematically illustrating one embodiment of a fuel cell.

FIG. 4 is a diagram schematically illustrating vanadium ion migration according to Example 1 and Comparative Example 1.

REFERENCE NUMERAL

100: Electrolyte Membrane
200a: Anode
200b: Cathode
10, 20: Tank
11, 21: Pump
31: Electrolyte Membrane
32: Positive Electrode Cell
33: Negative Electrode Cell
41: Positive Electrode Liquid Electrolyte
42: Negative Electrode Liquid Electrolyte
60: Stack
70: Oxidizer Supplying Unit
80: Fuel Supplying Unit
81: Fuel Tank
82: Pump

MODE FOR DISCLOSURE

Hereinafter, the present specification will be described in more detail.

In the present specification, a description of a certain part "including" certain constituents means capable of further including other constituents, and does not exclude other constituents unless particularly stated on the contrary.

In the present specification, a 'unit' is a repeated structure of a monomer being included in a polymer, and means a structure of a monomer being combined in a polymer through polymerization.

In the present specification, the meaning of 'including a unit' means being included in a main chain in a polymer.

In the present specification, the "electrolyte membrane" is a membrane capable of exchanging ions, and includes a membrane, an ion-exchange membrane, an ion-transfer membrane, an ion-conductive membrane, a separator, an ion-exchange separator, an ion-transfer separator, an ion-conductive separator, an ion-exchange electrolyte membrane, an ion-transfer electrolyte membrane, an ion-conductive electrolyte membrane or the like.

One embodiment of the present specification provides a polymer electrolyte membrane including a polymer including a unit represented by Chemical Formula 1; and a polymer including at least one cationic side chain.

In one embodiment of the present specification, the polymer including a unit represented by Chemical Formula 1 functions as a cation polymer in the polymer electrolyte membrane.

In another embodiment of the present specification, the polymer including at least one cationic side chain functions as an anion polymer in the polymer electrolyte membrane.

When the polymer electrolyte membrane includes only a cation polymer, durability and acid resistance decrease, and when used in a redox flow battery, efficiency may decrease due to a vanadium ion crossover through the membrane.

In addition, the polymer electrolyte membrane including only an anion polymer has a problem in that efficiency relatively decreases compared to a cation polymer.

The polymer electrolyte membrane according to one embodiment of the present specification includes both a cation polymer and an anion polymer, and therefore, while maintaining efficiency of the polymer electrolyte membrane, is capable of enhancing durability and acid resistance of the polymer electrolyte membrane, and preventing an efficiency decrease by reducing a vanadium ion crossover by a donnan effect.

In other words, the polymer electrolyte membrane according to one embodiment of the present specification may exhibit advantages of both a cation polymer electrolyte membrane and an anion polymer electrolyte membrane.

In one embodiment of the present specification, the polymer including a unit represented by Chemical Formula 1 and the polymer including at least one cationic side chain do not chemically form bonds with each other. In other words, the polymer electrolyte membrane according to one embodiment of the present specification is formed using a blending resin including the polymer including a unit represented by Chemical Formula 1 and the polymer including at least one cationic side chain.

When forming the polymer electrolyte membrane using a blending resin as above, the preparation process is simple compared to cases of using a copolymer in which the polymer including a unit represented by Chemical Formula 1 and the polymer including at least one cationic side chain chemically form bonds, which is economically effective in terms of costs and time.

In addition, when the polymer electrolyte membrane is formed using a blending resin as above and the polymer including a unit represented by Chemical Formula 1 and the polymer including at least one cationic side chain are crosslinked using a crosslinking agent, the polymers are not 100% crosslinked, or the crosslinking agent is added in excess and the residual crosslinking agent may cause a device performance decline.

Accordingly, when forming the polymer electrolyte membrane using a blending resin as above without including a separate crosslinking agent, a device performance decline may be prevented in the long term by using a blending resin including the polymer including a unit represented by Chemical Formula 1 and the polymer including at least one cationic side chain.

In one embodiment of the present specification, the polymer electrolyte membrane includes the polymer including a unit represented by Chemical Formula 1 and the polymer including at least one cationic side chain in a weight ratio of 1:1 to 1:50.

Specifically, the polymer electrolyte membrane in one embodiment of the present specification more preferably includes the polymer including a unit represented by Chemical Formula 1 and the polymer including at least one cationic side chain in a weight ratio of 1:5 to 1:30. More specifically, the polymer electrolyte membrane in one embodiment of the present specification more preferably includes the polymer including a unit represented by Chemical Formula 1 and the polymer including at least one cationic side chain in a weight ratio of 1:5 to 1:20.

Including the polymer including a unit represented by Chemical Formula 1 and the polymer including at least one cationic side chain in the above-mentioned range is effective in obtaining high durability and acid resistance and enhancing crossover prevention while maintaining high efficiency of the polymer electrolyte membrane.

Hereinafter, the polymer including a unit represented by Chemical Formula 1 included in the polymer electrolyte membrane will be described in detail.

In one embodiment of the present specification, the polymer electrolyte membrane includes the polymer including a unit represented by Chemical Formula 1.

In the present specification, an S atom is used as a linker of a $—[CR1R2]_n-A$ structure and a benzene ring in Chemical Formula 1. In this case, an electron withdrawing character of the $—[CR1R2]_n-A$ linked by the S atom allows the polymer to be readily formed, and a stable polymer may be provided.

In one embodiment of the present specification, R1 and R2 are the same as or different from each other, and each independently a halogen group. Specifically, R1 and R2 may be each independently selected from the group consisting of F; Cl; Br; and I.

When the polymer including a unit represented by Chemical Formula 1 of the present specification is included in the polymer electrolyte membrane and R1 and R2 of Chemical Formula 1 are a halogen group, there is an advantage in that electrons are favorably attracted increasing acidity of the A functional group at the end and thereby facilitating hydrogen ion migration, and the structure of the polymer electrolyte membrane is strengthened. Specifically, according to one embodiment of the present specification, the advantage may be maximized when R1 and R2 are fluorine.

In one embodiment of the present specification, n is an integer of 2 to 10. In another embodiment of the present specification, n is an integer of 2 to 6.

A monomer including the unit of Chemical Formula 1 according to one embodiment of the present specification may control the number of n. In this case, by controlling the length of the structure in the parenthesis, phase separation of the polymer electrolyte membrane may be readily accomplished, and hydrogen ion migration of the polymer electrolyte membrane may be facilitated.

In one embodiment of the present specification, n is 2.
In another embodiment, n is 3.
In another embodiment, n is 4.
In another embodiment, n is 5.
In another embodiment, n is 6.
In another embodiment, n is 7.
In one embodiment of the present specification, n is 8.
In another embodiment, n is 9.
In one embodiment of the present specification, n is 10.

In one embodiment of the present specification, A is $—SO_3H$ or $—SO_3^-M^+$.

In another embodiment, A is $—SO_3H$.

As above, when A is $—SO_3H$ or $—SO_3^-M^+$ in Chemical Formula 1, a chemically stable polymer may be formed.

In one embodiment of the present specification, M is a group 1 element.

In the present specification, the group 1 element may be Li, Na or K.

In one embodiment of the present specification, the unit represented by Chemical Formula 1 may be represented by any one of the following Chemical Formulae 1-1 to 1-9.

[Chemical Formula 1-1]

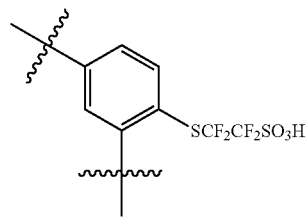

[Chemical Formula 1-2]

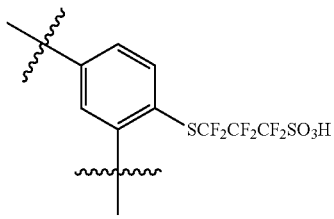

[Chemical Formula 1-3]

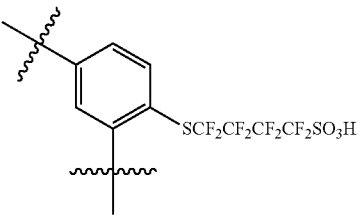

[Chemical Formula 1-4]

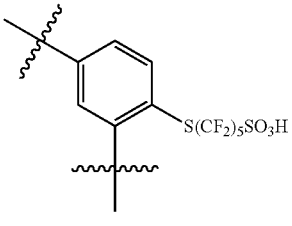

[Chemical Formula 1-5]

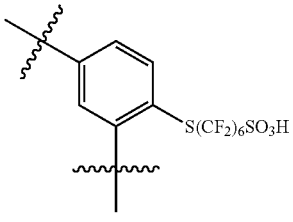

-continued

[Chemical Formula 1-6]
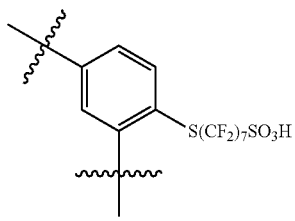

[Chemical Formula 1-7]
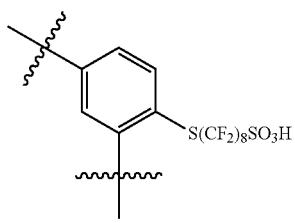

[Chemical Formula 1-8]
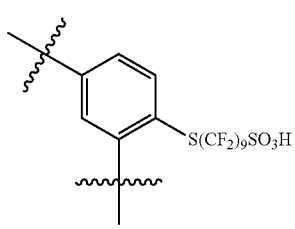

[Chemical Formula 1-9]
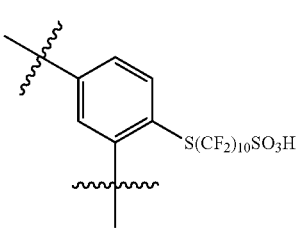

In one embodiment of the present specification, the polymer including a unit represented by Chemical Formula 1 includes the unit represented by Chemical Formula 1 in 1 mol % to 100 mol %. Specifically, in one embodiment of the present specification, the polymer includes only the unit represented by Chemical Formula 1.

In still another embodiment, the polymer including a unit represented by Chemical Formula 1 may further include a different second unit in addition to the unit represented by Chemical Formula 1. In one embodiment of the present specification, when the polymer further includes a second unit, the content of the unit represented by Chemical Formula 1 is preferably from 5 mol % to 65 mol %.

The unit represented by Chemical Formula 1 according to one embodiment of the present specification performs a role of controlling ion conductivity of a separator.

The second unit according to another embodiment may be selected from among units enhancing mechanical strength of the polymer, and the type is not limited as long as it is a unit capable of enhancing mechanical strength.

In one embodiment of the present specification, the polymer including a unit represented by Chemical Formula 1 is a random polymer.

Specifically, in one embodiment of the present specification, the unit represented by Chemical Formula 1 and the second unit may form a random polymer.

In the unit represented by Chemical Formula 1 according to one embodiment of the present specification, functional groups including a partial fluorine-based stretch out in a pendant form, and therefore, phase separation is readily obtained since partial fluorine-based functional groups in the polymer are favorably aggregated. Accordingly, ion channels are readily formed and ions are selectively exchanged enhancing ion conductivity of a separator.

In one embodiment of the present specification, the polymer including a unit represented by Chemical Formula 1 is a block polymer including a hydrophilic block; and a hydrophobic block, and the hydrophilic block includes the unit represented by Chemical Formula 1.

In one embodiment of the present specification, the hydrophilic block and the hydrophobic block are included in a ratio of 1:0.1 to 1:10 in the block polymer. In one embodiment of the present specification, the hydrophilic block and the hydrophobic block are included in a ratio of 1:0.1 to 1:2 in the block polymer.

In this case, an ion transfer ability of the block polymer may be enhanced.

In one embodiment of the present specification, the unit represented by Chemical Formula 1 is included in 0.01 mol % to 100 mol % in the hydrophilic block based on the hydrophilic block.

In one embodiment of the present specification, the hydrophilic block has a number average molecular weight of 1,000 g/mol to 300,000 g/mol. In a specific embodiment, the number average molecular weight is from 2,000 g/mol to 100,000 g/mol. In another embodiment, the number average molecular weight is from 2,500 g/mol to 50,000 g/mol.

In one embodiment of the present specification, the hydrophobic block has a number average molecular weight of 1,000 g/mol to 300,000 g/mol. In a specific embodiment, the number average molecular weight is from 2,000 g/mol to 100,000 g/mol. In another embodiment, the number average molecular weight is from 2,500 g/mol to 50,000 g/mol.

According to an embodiment of the present specification, the hydrophilic block and the hydrophobic block are clearly divided and separated in the block polymer and phase separation is readily obtained, and therefore, ions are readily transferred. According to one embodiment of the present specification, the hydrophilic block and the hydrophobic block are more clearly divided when including the unit represented by Chemical Formula 1, and an ion transfer effect may be more superior than existing polymers.

In the present specification, the "block polymer" means a polymer formed by one block, and one or two or more blocks that are different from the one block being linked to each other by a polymer main chain.

The "hydrophilic block" of the present specification means a block having an ion-exchange group as a functional group. Herein, the functional group may mean A in Chemical Formula 1 described above. That is, the ion-exchange group may be one or two types selected from the group consisting of $-SO_3H$, $-SO_3^-M^+$, $-COOH$, $-COO^-M^+$, $-PO_3H_2$, $-PO_3H^-M^+$, $-PO_3^{2-}2M^+$, $-O(CF_2)_mSO_3H$, $-O(CF_2)_mSO_3^-M^+$, $-O(CF_2)_mCOOH$, $-O(CF_2)_mCOO^-M^+$, $-O(CF_2)_mPO_3H_2$, $-O(CF_2)_mPO_3H^-M^+$ and $-O(CF_2)_mPO_2^{3-}2M^+$. Herein, M may be a metallic element. In other words, the functional group may be hydrophilic.

The "block having an ion-exchange group" of the present specification means a block including an average of 0.5 or more ion-exchange groups when representing as the number of ion-exchange groups per one structure unit forming the corresponding block, and including an average of 1.0 or more ion-exchange groups per one structure unit is more preferred.

The "hydrophobic block" of the present specification means the polymer block that does not substantially include an ion-exchange group.

The "block that does not substantially include an ion-exchange group" of the present specification means a block including an average of less than 0.1 ion-exchange groups when representing as the number of ion-exchange groups per one structure unit forming the corresponding block, and including an average of 0.05 or less is more preferred, and a block that does not include an ion-exchange group at all is even more preferred.

In one embodiment of the present specification, the polymer including a unit represented by Chemical Formula 1 further includes a brancher derived from a compound represented by the following Chemical Formula 4; or a brancher represented by the following Chemical Formula 5.

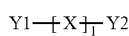
[Chemical Formula 4]

[Chemical Formula 5]

In Chemical Formulae 4 and 5,

X is S; O; CO; SO; $SO_2$; NR""; a hydrocarbon-based or fluorine-based assembly, l is an integer of 0 to 10, when l is 2 or greater, two or more Xs are the same as or different from each other, Y1 and Y2 are the same as or different from each other, and each independently NR""R""; an aromatic ring which is once or twice or more substituted with a substituent selected from the group consisting of a hydroxyl group and a halogen group; or an aliphatic ring which is once or twice or more substituted with a substituent selected from the group consisting of a hydroxyl group and a halogen group, R"" is hydrogen; an aromatic ring substituted with a halogen group; or an aliphatic ring substituted with a halogen group, Z is a trivalent organic group.

In the present specification, the "brancher" performs a role of linking or crosslinking polymer chains.

In the present specification, the "derived" means producing new bonds as bonds of a compound are cut or substituents fall off, and the unit derived from the compound may mean a unit linked to a main chain of a polymer. The unit may form a polymer by being included in a main chain of the polymer.

Specifically, the brancher derived from the compound of Chemical Formula 4 in the present specification may function as a brancher as, in each of Y1 and Y2, an aromatic ring substituted with a halogen group; or an aliphatic ring substituted with a halogen group, the halogen group falls off from the aromatic ring or the aliphatic ring. Specifically, the brancher derived from the compound of Chemical Formula 4 in the present specification may function as a brancher in the polymer as two or more halogen groups fall off.

In the polymer further including the brancher in the present specification, the brancher may directly form a main chain of the polymer, and a mechanical degree of integration of a thin membrane may be enhanced.

Specifically, in the branched polymer of the present disclosure, the brancher directly forms a main chain of the polymer without carrying out a post-sulfonation reaction or a cross-linking reaction of a sulfonated polymer by polymerizing branched hydrophobic blocks that do not include acid substituents and branched hydrophilic blocks that include acid substituents, and the hydrophobic blocks maintaining a mechanical degree of integration of a thin membrane and the hydrophilic blocks providing ion conductivity to the thin membrane are alternately linked through chemical bonds.

In one embodiment of the present specification, l is 3 or greater.

In one embodiment of the present specification, X is S.

In another embodiment, X is a haloalkyl group.

In still another embodiment, X is $CH_2$.

In another embodiment of the present specification, X is NR.

In one embodiment of the present specification, Y1 and Y2 are the same as or different from each other, and each independently a halogen-substituted aromatic ring.

In one embodiment of the present specification, Y1 and Y2 are the same as or different from each other, and each independently a fluorine-substituted aromatic hydrocarbon ring.

In one embodiment of the present specification, Y1 and Y2 are the same as or different from each other, and each independently NR""R"".

In another embodiment, Y1 and Y2 are each a fluorine-substituted phenyl group. Specifically, 2,4-phenyl, 2,6-phenyl, 2,3-phenyl, 3,4-phenyl and the like are included, however, Y1 and Y2 are not limited thereto.

In one embodiment of the present specification, the compound represented by Chemical Formula 4 may be represented by any one of the following structures.

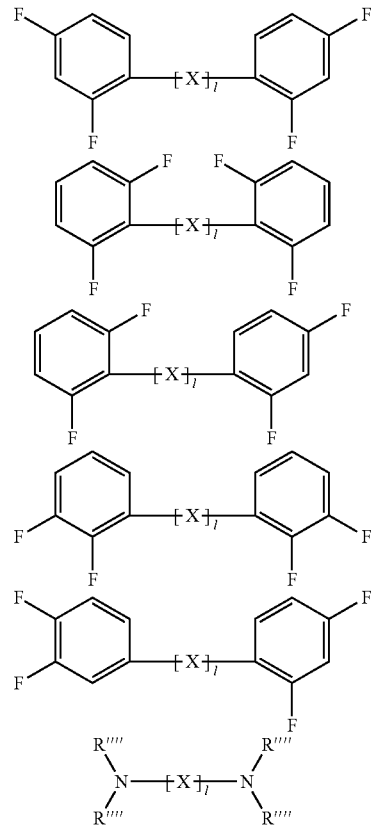

In the structures, definitions of X, 1 and R'''' are the same as in Chemical Formula 4.

According to one embodiment of the present specification, Z in Chemical Formula 5 may be represented by any one of the following Chemical Formulae 5-1 to 5-4.

[Chemical Formula 5-1]

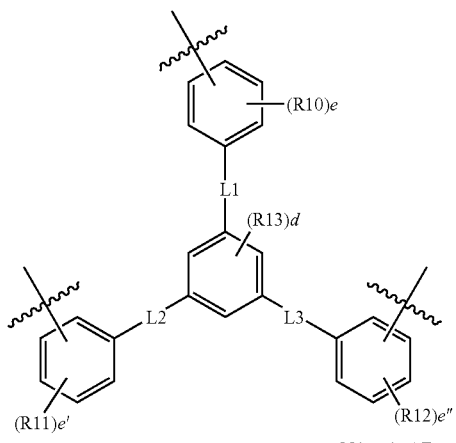

[Chemical Formula 5-2]

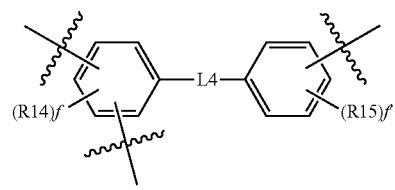

[Chemical Formula 5-3]

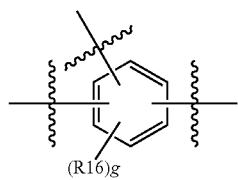

[Chemical Formula 5-4]

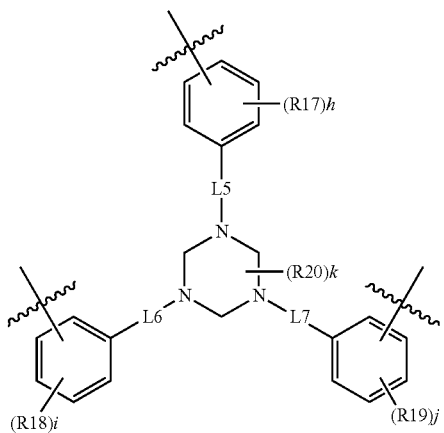

In Chemical Formulae 5-1 to 5-4,

L1 to L7 are the same as or different from each other, and each independently a direct bond; —S—; —O—; —CO—; or —SO$_2$—, R10 to R20 are the same as or different from each other, and each independently hydrogen; deuterium; a halogen group; a cyano group; a nitrile group; a nitro group; a hydroxyl group; a substituted or unsubstituted alkyl group; a substituted or unsubstituted cycloalkyl group; a substituted or unsubstituted alkoxy group; a substituted or unsubstituted alkenyl group; a substituted or unsubstituted aryl group; or a substituted or unsubstituted heteroaryl group, e, e', e'', f', h, i and j are each an integer of 1 to 4, d, f and g are each an integer of 1 to 3, k is an integer of 1 to 6, and when d, e, e', e'', f, f', g, h, i, j and k are each an integer of 2 or greater, two or more structures in the parentheses are the same as or different from each other.

In one embodiment of the present specification, L1 is CO.

In another embodiment, L1 is SO$_2$.

In another embodiment, L1 is S.

In another embodiment, L2 is CO.

In another embodiment, L2 is SO$_2$.

In another embodiment, L2 is S.

In one embodiment of the present specification, L3 is CO.

In another embodiment, L3 is SO$_2$.

In another embodiment, L3 is S.

In one embodiment of the present specification, L4 is CO.

In another embodiment, L4 is SO$_2$.

In one embodiment of the present specification, R10 to R20 are hydrogen.

In one embodiment of the present specification, R16 is a halogen group.

In another embodiment, R16 is fluorine.

In addition, in one embodiment of the present specification, the brancher represented by Chemical Formula 5 may be represented by any one of the following structures.

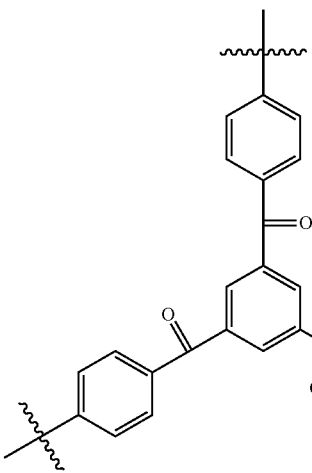

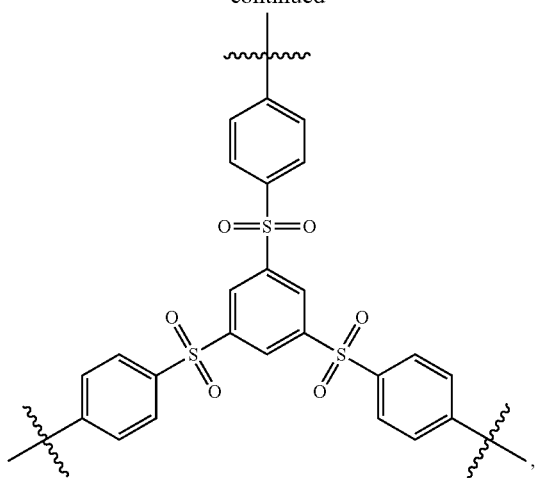

,

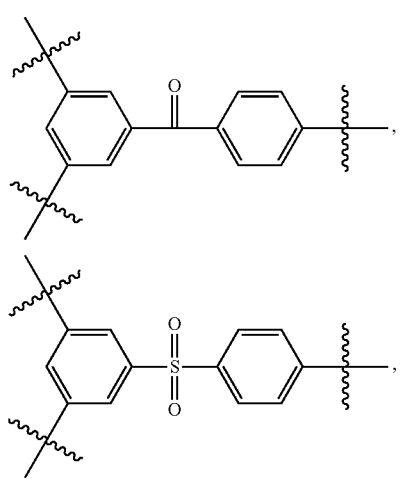

,

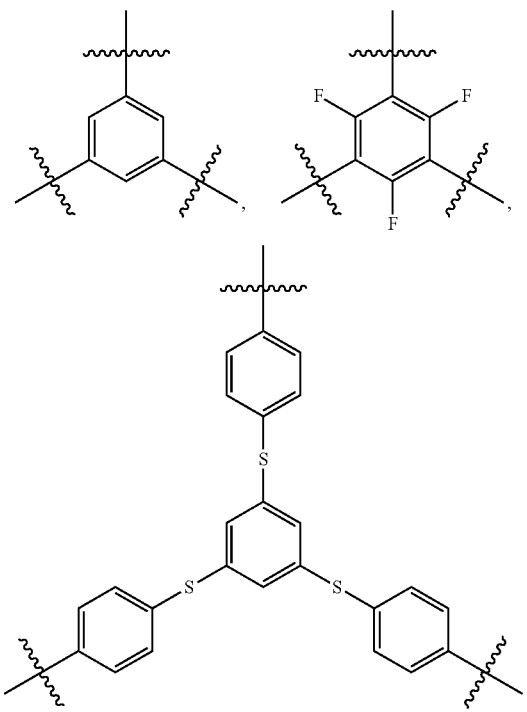

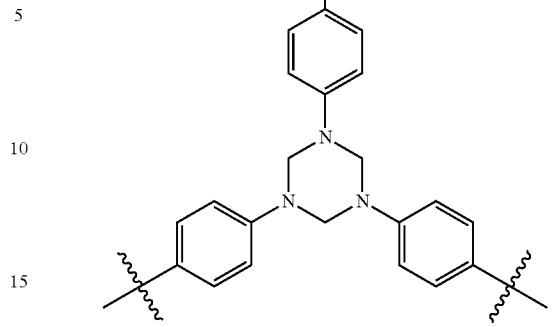

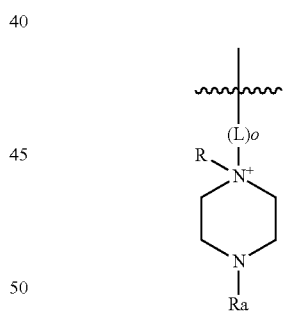

In one embodiment of the present specification, the polymer has a weight average molecular weight of 500 g/mol to 5,000,000 g/mol. In another embodiment of the present specification, the polymer has a weight average molecular weight of 10,000 g/mol to 3,000,000 g/mol. When the polymer has a weight average molecular weight in the above-mentioned range, mechanical properties of an electrolyte membrane including the polymer do not decline, and proper polymer solubility is maintained, and therefore, the electrolyte membrane may be readily prepared.

Hereinafter, the polymer including at least one cationic side chain included in the polymer electrolyte membrane will be described in detail.

The polymer electrolyte membrane according to one embodiment of the present specification includes a polymer including at least one cationic side chain.

In one embodiment of the present specification, the cationic side chain is -(L)o-N$^+$RR'R"; -(L)o-P$^+$RR'R"; or the following Chemical Formula 1-A.

[Chemical Formula 1-A]

L is a direct bond; O; NR'''; S; SO$_2$; or a substituted or unsubstituted alkylene group having 1 to 10 carbon atoms, o is an integer of 1 to 10, when o is 2 or greater, two or more Ls are the same as or different from each other, and R, R', R", R''' and Ra are the same as or different from each other, and each independently hydrogen; or a substituted or unsubstituted alkyl group having 1 to 10 carbon atoms.

In one embodiment of the present specification, the polymer including at least one cationic side chain includes —(C=O)—; —(SO$_2$)—; or —C(CF$_3$)$_2$— in the main chain.

In another embodiment, the polymer including at least one cationic side chain includes a unit represented by the following Chemical Formula 2.

[Chemical Formula 2]

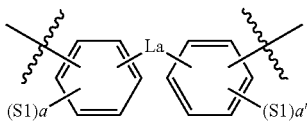

In Chemical Formula 2,

La is CO; $SO_2$; or $C(CF_3)_2$,

S1 and S2 are the same as or different from each other, and each independently hydrogen; deuterium; a halogen group; a cyano group; a nitrile group; a nitro group; a hydroxyl group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted aryl group; a substituted or unsubstituted heterocyclic group; -(L)o-$N^+RR'R''$; -(L)o-$P^+RR'R''$; or the following Chemical Formula 1-A,

[Chemical Formula 1-A]

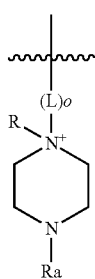

In Chemical Formula 1-A,

L is a direct bond; O; NR'''; S; $SO_2$; or a substituted or unsubstituted alkylene group having 1 to 10 carbon atoms, o is an integer of 1 to 10, when o is 2 or greater, two or more Ls are the same as or different from each other, R, R', R'', R''' and Ra are the same as or different from each other, and each independently hydrogen; or a substituted or unsubstituted alkyl group having 1 to 10 carbon atoms, a and a' are each an integer of 1 to 4, and when a and a' are each an integer of 2 or greater, two or more structures in the parentheses are the same as or different from each other.

In one embodiment of the present specification, the unit represented by Chemical Formula 2 is represented by any one of the following Chemical Formulae 2-1 to 2-3.

[Chemical Formula 2-1]

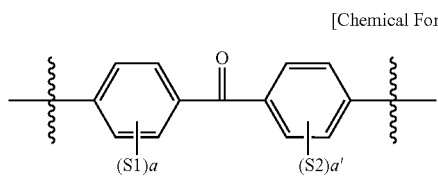

[Chemical Formula 2-2]

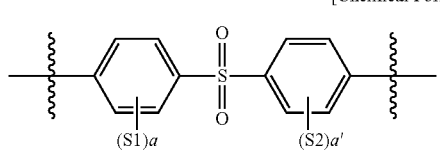

[Chemical Formula 2-3]

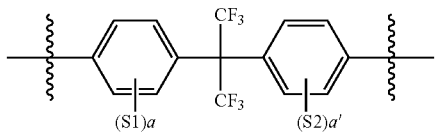

In Chemical Formulae 2-1 to 2-3,

S1, S2, a and a' have the same definitions as above.

In one embodiment of the present specification, the polymer including at least one cationic side chain includes the unit represented by Chemical Formula 2 in 1 mol % to 100 mol %.

In another embodiment, the polymer including at least one cationic side chain may further include other additional units in addition to the unit represented by Chemical Formula 2.

In one embodiment of the present specification, the polymer including at least one cationic side chain further includes a unit derived from a compound represented by the following Chemical Formula 3.

[Chemical Formula 3]

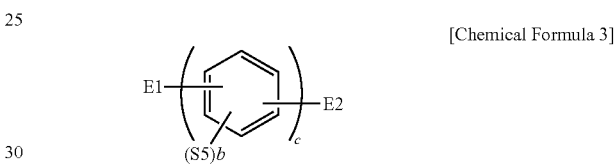

In Chemical Formula 3,

E1 and E2 are a hydroxyl group or a thiol group,

S5 is hydrogen; deuterium; a halogen group; a cyano group; a nitrile group; a nitro group; a hydroxyl group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted aryl group; a substituted or unsubstituted heterocyclic group; -(L)o-$N^+RR'R''$; -(L)o-$P^+RR'R''$; or the following Chemical Formula 1-A,

[Chemical Formula 1-A]

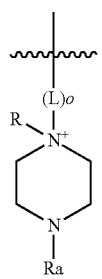

In Chemical Formula 1-A,

L is a direct bond; O; NR'''; S; $SO_2$; or a substituted or unsubstituted alkylene group having 1 to 10 carbon atoms, o is an integer of 1 to 10, when o is 2 or greater, two or more Ls are the same as or different from each other, R, R', R'', R''' and Ra are the same as or different from each other, and each independently hydrogen; or a substituted or unsubstituted alkyl group having 1 to 10 carbon atoms, b is an integer of 1 to 4, c is an integer of 1 to 3, and when b and c are each an integer of 2 or greater, two or more structures in the parentheses are the same as or different from each other.

In one embodiment of the present specification, the unit derived from the compound represented by Chemical Formula 3 may mean E1 and E2 being a thiol group or a hydroxyl group, and the thiol group or the hydroxyl group being linked to the main chain of the polymer while being dehydrogenated. The derived unit may also include the meaning of being linked to the main chain of the polymer while being dehydrogenated, and also include modifying a site linked to the main chain through post-treatment such as acid treatment and heat treatment.

For example, in one embodiment of the present specification, a linking group of —O— may be provided in the main chain of the polymer when E1 or E2 is a hydroxyl group, and a linking group of —S— may be provided in the main chain of the polymer when E1 and E2 are a thiol group. In addition, as necessary, the linking group of —S— in the main chain of the polymer may be modified to —SO$_2$— through acid treatment.

In one embodiment of the present specification, R, R' and R" are the same as or different from each other, and each independently an alkyl group having 1 to 10 carbon atoms.

In one embodiment, R, R' and R" are a methyl group.

In one embodiment of the present specification, E1 and E2 are a hydroxyl group or a thiol group.

In another embodiment, E1 is a hydroxyl group.

In another embodiment, E1 is a thiol group.

In one embodiment of the present specification, E2 is a hydroxyl group.

In another embodiment, E2 is a thiol group.

In one embodiment of the present specification, c is 1.

In another embodiment, c is 2.

In one embodiment of the present specification, the compound represented by Chemical Formula 3 is represented by any one of the following Chemical Formulae 3-1 to 3-4.

[Chemical Formula 3-1]

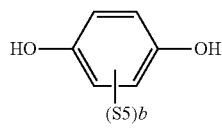

[Chemical Formula 3-2]

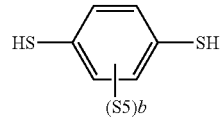

[Chemical Formula 3-3]

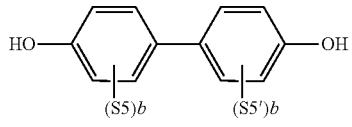

[Chemical Formula 3-4]

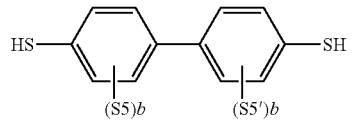

In Chemical Formulae 3-1 to 3-4,

S5 and b have the same definitions as above,

S5' is the same as or different from S5, and has the same definition as S5, and when b is 2 or greater, structures in a plurality of the parentheses are the same as or different from each other.

In one embodiment of the present specification, it is sufficient that the polymer including at least one cationic side chain includes a cation side chain, and positions of the inclusion are not limited.

In one embodiment of the present specification, S1 is

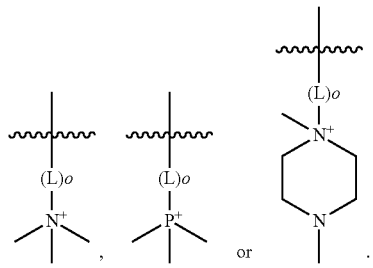

In another embodiment, S2 is

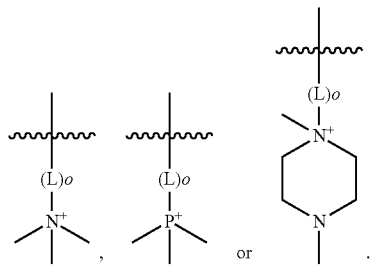

In one embodiment of the present specification, S5 is

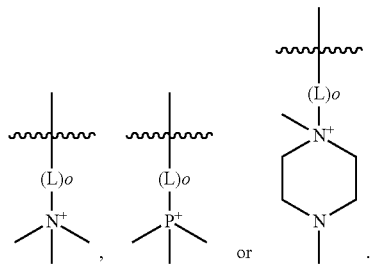

In another embodiment, the polymer including at least one cationic side chain is a random polymer.

In another embodiment, the polymer including at least one cationic side chain is a block polymer.

In another embodiment, the polymer including at least one cationic side chain further includes a brancher.

In one embodiment of the present specification, the polymer including at least one cationic side chain further includes the brancher derived from the compound represented by Chemical Formula 4; or the brancher represented by Chemical Formula 5. Chemical Formula 4 and 5 are the same as those described above.

Examples of the substituents of the present specification are described below, however, the substituents are not limited thereto.

In the present specification,

means binding to adjacent substituents or a main chain of a polymer.

The term "substitution" means a hydrogen atom bonding to a carbon atom of a compound is changed to another substituent, and the position of substitution is not limited as long as it is a position at which the hydrogen atom is substituted, that is, a position at which a substituent can substitute, and when two or more substituents substitute, the two or more substituents may be the same as or different from each other.

In the present specification, the hydrocarbon-based means an organic compound formed only with carbon and hydrogen, and includes linear, branched, cyclic hydrocarbon and the like, but is not limited thereto. In addition, a single bond, a double bond or a triple bond may be included, however, the hydrocarbon-based is not limited thereto.

In the present specification, a fluorine-based assembly means a part or all of carbon-hydrogen bonds in the hydrocarbon-based are substituted with fluorine.

In the present specification, the aromatic ring may be an aromatic hydrocarbon ring or an aromatic heteroring, and may be monocyclic or multicyclic.

Specifically, examples of the aromatic hydrocarbon ring may include a monocyclic aromatic group such as a phenyl group, a biphenyl group and a terphenyl group, and a multicyclic aromatic group such as a naphthyl group, a binaphthyl group, an anthracenyl group, a phenanthrenyl group, a pyrenyl group, a perylenyl group, a tetracenyl group, a chrysenyl group, a fluorenyl group, an acenaphthacenyl group, a triphenylene group and a fluoranthene group, but are not limited thereto.

In the present specification, the aromatic heteroring means a structure including one or more heteroatoms such as O, S, N and Se instead of a carbon atom in the aromatic hydrocarbon ring. Specific examples thereof may include a thiophene group, a furan group, a pyrrole group, an imidazole group, a thiazole group, an oxazole group, an oxadiazole group, a triazole group, a pyridyl group, a bipyridyl group, a pyrimidyl group, a triazine group, a triazole group, an acridyl group, a pyridazine group, a pyrazinyl group, a quinolinyl group, a quinazoline group, a quinoxalinyl group, a phthalazinyl group, a pyridopyrimidinyl group, a pyridopyrazinyl group, a pyrazinopyrazinyl group, an isoquinoline group, an indole group, a carbazole group, a benzoxazole group, a benzimidazole group, a benzothiazole group, a benzocarbazole group, a benzothiophene group, a dibenzothiophene group, a benzofuranyl group, a phenanthroline group, a thiazolyl group, an isoxazolyl group, an oxadiazolyl group, a thiadiazolyl group, a benzothiazolyl group, a phenothiazinyl group, a dibenzofuranyl group and the like, but are not limited thereto.

In the present specification, the aliphatic ring may be an aliphatic hydrocarbon ring or an aliphatic heteroring, and may be monocyclic or multicyclic. Examples of the aliphatic ring may include a cyclopentyl group, a cyclohexyl group and the like, but are not limited thereto.

In the present specification, the organic group may include an alkyl group, an alkenyl group, a cycloalkyl group, a cycloalkenyl group, an aryl group, an aralkyl group and the like. This organic group may include bonds or substituents besides a hydrocarbon group such as heteroatoms in the organic group. In addition, the organic group may be any of linear, branched or cyclic.

In the present specification, the trivalent organic group means a trivalent group having 3 binding sites in an organic compound.

In addition, the organic group may form a cyclic structure, and may form bonds including heteroatoms as long as it does not harm effects of the present disclosure.

Specifically, bonds including heteroatoms such as an oxygen atom, a nitrogen atom and a silicon atom may be included. Specific examples thereof may include ether bonds, thioether bonds, carbonyl bonds, thiocarbonyl bonds, ester bonds, amide bonds, urethane bonds, imino bonds (—N=C(-A)-, —C(=NA)-: A represents a hydrogen atom or an organic group), carbonate bonds, sulfonyl bonds, sulfinyl bonds, azo bonds and the like, but are not limited thereto.

Examples of the cyclic structure may include the aromatic ring, the aliphatic ring and the like described above, and the cyclic structure may be monocyclic or multicyclic.

In the present specification, the alkyl group may be linear or branched, and although not particularly limited thereto, the number of carbon atoms is preferably from 1 to 50. Specific examples thereof may include a methyl group, an ethyl group, a propyl group, an isopropyl group, a butyl group, a t-butyl group, a pentyl group, a hexyl group, a heptyl group and the like, but are not limited thereto.

In the present specification, the alkenyl group may be linear or branched, and although not particularly limited thereto, the number of carbon atoms is preferably from 2 to 40. Specific examples thereof may include vinyl, 1-propenyl, isopropenyl, 1-butenyl, 2-butenyl, 3-butenyl, 1-pentenyl, 2-pentenyl, 3-pentenyl, 3-methyl-1-butenyl, 1,3-butadienyl, allyl, 1-phenylvinyl-1-yl, 2-phenylvinyl-1-yl, 2,2-diphenylvinyl-1-yl, 2-phenyl-2-(naphthyl-1-yl)vinyl-1-yl, 2,2-bis(diphenyl-1-yl)vinyl-1-yl, a stilbenyl group, a styrenyl group and the like, but are not limited thereto.

In the present specification, the cycloalkyl group is not particularly limited, but preferably has 3 to 60 carbon atoms, and particularly, may include a cyclopentyl group, a cyclohexyl group and the like, but is not limited thereto.

The polymer electrolyte membrane according to one embodiment of the present specification may be prepared using materials and/or methods known in the art except for including the polymer including a unit represented by Chemical Formula 1 and the polymer including at least one cationic side chain.

According to one embodiment of the present specification, the polymer electrolyte membrane has ion conductivity of greater than or equal to 0.01 S/cm and less than or equal to 0.5 S/cm. In another embodiment, the polymer electrolyte membrane has ion conductivity of greater than or equal to 0.01 S/cm and less than or equal to 0.3 S/cm.

In one embodiment of the present specification, ion conductivity of the polymer electrolyte membrane may be measured under a humidity condition. A humidity condition in the present specification may mean relative humidity (RH) of 10% to 100%.

In addition, in one embodiment of the present specification, the polymer electrolyte membrane has an ion exchange capacity (IEC) value of 0.01 mmol/g to 5 mmol/g. When the polymer electrolyte membrane has an ion exchange capacity value in the above-mentioned range, ion channels are formed in the polymer electrolyte membrane, and the polymer may exhibit ion conductivity.

In one embodiment of the present specification, the polymer electrolyte membrane has a thickness of 1 μm to 500 μm. The polymer electrolyte membrane having the above-mentioned thickness range reduces electric short and electrolyte material crossover, and may exhibit an excellent cation conductivity property.

In one embodiment of the present specification, the polymer electrolyte membrane is a pure membrane including only the polymer including a unit represented by Chemical Formula 1; and the polymer including at least one cationic side chain.

In another embodiment, the polymer electrolyte membrane is a reinforced membrane further including a substrate.

In other words, one embodiment of the present specification provides a reinforced membrane including a substrate; the polymer including a unit represented by Chemical Formula 1; and the polymer including at least one cationic side chain.

In one embodiment of the present specification, the 'reinforced membrane' is an electrolyte membrane including a substrate, a reinforcing material, and a membrane capable of exchanging ions, and may mean a substrate-including membrane, ion-exchange membrane, ion-transfer membrane, ion-conductive membrane, separator, ion-exchange separator, ion-transfer separator, ion-conductive separator, ion-exchange electrolyte membrane, ion-transfer electrolyte membrane, ion-conductive electrolyte membrane or the like.

In the present specification, the substrate may mean a support having a three-dimensional network structure, and the reinforced membrane including the substrate and the polymer may mean the polymer being included in at least a part of one surface of the substrate, a surface opposite to the one surface and a pore region inside the substrate. In other words, the reinforced membrane of the present specification may be provided in a form of the polymer being impregnated in the substrate.

The polymer is a blending resin of the polymer including a unit represented by Chemical Formula 1; and the polymer including at least one cationic side chain, and is the same as described above.

Hydrocarbon-based ion-transfer separators have problems in that an ion transfer ability is inferior compared to fluorine-based separators, and chemical resistance is weak. Accordingly, by including the polymer including a unit represented by Chemical Formula 1, the reinforced membrane according to one embodiment of the present specification has high mechanical strength and high ion conductivity, and phase separation of the reinforced membrane may be readily accomplished.

In addition, by including the substrate, the reinforced membrane according to one embodiment of the present specification enhances chemical resistance and durability, and thereby enhances a lifespan of a device.

In one embodiment of the present specification, one or two types from the group consisting of polypropylene (PP), polytetrafluoroethylene (PTFE), polyethylene (PE) and polyvinylidene fluoride (PVDF) are selected as the substrate.

In one embodiment of the present specification, the content of the blending resin is from 10 parts by weight to 99 parts by weight with respect to 100 parts by weight of the reinforced membrane.

In another embodiment, the content of the blending resin is from 10 parts by weight to 99 parts by weight and the content of the substrate is from 1 part by weight to 90 parts by weight, with respect to 100 parts by weight of the reinforced membrane. As the content of the substrate increases, a vanadium ion crossover may be reduced, and as the content of the blending resin increases, battery performance may be enhanced.

Accordingly, when the content of the substrate and the blending resin according to one embodiment of the present specification is in the above-mentioned range, a vanadium ion crossover may be reduced while maintaining battery performance.

According to one embodiment of the present specification, the reinforced membrane has ion conductivity of greater than or equal to 0.001 S/cm and less than or equal to 0.5 S/cm. In another embodiment, the reinforced membrane has ion conductivity of greater than or equal to 0.001 S/cm and less than or equal to 0.3 S/cm.

In the present specification, ion conductivity may be measured under the same condition as described above.

In addition, in one embodiment of the present specification, the reinforced membrane has an ion exchange capacity (IEC) value of 0.01 mmol/g to 5.0 mmol/g. When the reinforced membrane has an ion exchange capacity value in the above-mentioned range, ion channels are formed in the reinforced membrane, and the polymer may exhibit ion conductivity.

In one embodiment of the present specification, the reinforced membrane has a thickness of 0.01 μm to 10,000 μm. The reinforced membrane having the above-mentioned thickness range reduces electric short and electrolyte material crossover, and may exhibit an excellent cation conductivity property.

One embodiment of the present specification also provides a method for preparing a reinforced membrane including preparing a substrate; and impregnating the substrate into the blending resin.

In the present specification, impregnation means a polymer infiltrating into a substrate. The impregnation in the present specification may be carried out by dipping the substrate into the polymer, slot die coating, bar casting and the like.

In the present specification, dipping may be expressed by terms such as dip coating or dipping method.

In one embodiment of the present specification, the reinforced membrane may have directivity. Specifically, in one embodiment of the present specification, the substrate may be prepared through monoaxial orientation or biaxial orientation, and directivity of the substrate obtained by the orientation may determine directivity of the reinforced membrane. Therefore, the reinforced membrane according to one embodiment of the present specification may have directivity in a machine direction (MD) and in a direction perpendicular to the machine direction (MD), and the reinforced membrane may exhibit differences in the properties such as stress and elongation depending on the directivity.

One embodiment of the present specification also provides a method for preparing a reinforced membrane including preparing a substrate; and dipping the substrate into a blending resin including the polymer including a unit represented by Chemical Formula 1 and the polymer including at least one cationic side chain.

In the present specification, the substrate and the blending resin are the same as described above.

One embodiment of the present specification also provides a membrane-electrode assembly including an anode; a cathode; and the polymer electrolyte membrane described above provided between the anode and the cathode.

The membrane-electrode assembly (MEA) means an assembly of electrodes (cathode and anode) in which an electrochemical catalyst reaction of fuel and air occurs and a polymer membrane in which hydrogen ion transfer occurs, and is a single assembled unit in which electrodes (cathode and anode) and an electrolyte membrane are adhered.

The membrane-electrode assembly of the present specification has a form of a catalyst layer of an anode and a catalyst layer of a cathode being brought into contact with an electrolyte membrane, and may be prepared using common methods known in the art. As one example, the membrane-electrode assembly may be prepared through thermocompressing the cathode; the anode; and the electrolyte membrane located between the cathode and the anode at 100° C. to 400° C. while sticking these together.

The anode electrode may include an anode catalyst layer and an anode gas diffusion layer. The anode gas diffusion layer may again include an anode micropore layer and an anode electrode substrate.

The cathode electrode may include a cathode catalyst layer and a cathode gas diffusion layer. The cathode gas diffusion layer may again include a cathode micropore layer and a cathode electrode substrate.

FIG. 1 is a diagram schematically showing a principle of electricity generation of a fuel cell, and in the fuel cell, a most basic unit generating electricity is a membrane-electrode assembly (MEA), and this is formed with an electrolyte membrane (100), and anode (200a) and cathode (200b) electrodes formed on both sides of the electrolyte membrane (100). When referring to FIG. 1 showing a principle of electricity generation of a fuel cell, an oxidation reaction of fuel such as hydrogen, methanol, or hydrocarbon such as butane occurs in the anode (200a) to generate hydrogen ions ($H^+$) and electrons ($e^-$), and the hydrogen ions migrate to the cathode (200b) through the electrolyte membrane (100). In the cathode (200b), water is produced through the reaction of the hydrogen ions transferred through the electrolyte membrane (100), an oxidizer such as oxygen, and electrons. Electrons migrate to an external circuit through such a reaction.

The anode electrode catalyst layer is a place where an oxidation reaction of fuel occurs, and catalysts selected from the group consisting of platinum, ruthenium, osmium, platinum-ruthenium alloys, platinum-osmium alloys, platinum-palladium alloys and platinum-transition metal alloys may be preferably used. The cathode electrode catalyst layer is a place where a reduction reaction of an oxidizer occurs, and platinum or platinum-transition metal alloys may be preferably used as catalysts. The catalysts may be used as they are, or may be used while being supported on a carbon-based carrier.

The process of introducing the catalyst layer may be carried out using common methods known in the art, and for example, a catalyst ink may be directly coated on the electrolyte membrane, or coated on the gas diffusion layer to form the catalyst layer. Herein, the coating method of the catalyst ink is not particularly limited, and methods of spray coating, tape casting, screen printing, blade coating, die coating, spin coating or the like may be used. The catalyst ink may be typically formed with a catalyst, a polymer ionomer and a solvent.

The gas diffusion layer becomes a migration path of reaction gases and water while performing a role of a current conductor, and has a porous structure. Accordingly, the gas diffusion layer may be formed including a conductive substrate. As the conductive substrate, carbon paper, carbon cloth or carbon felt may be preferably used. The gas diffusion layer may be formed further including a micropore layer between the catalyst layer and the conductive substrate. The micropore layer may be used for enhancing fuel cell performance under a low humidity condition, and performs a role of allowing the electrolyte membrane to be under a sufficiently wet condition by having the amount of water escaping outside the gas diffusion layer being small.

One embodiment of the present specification provides a polymer electrolyte-type fuel cell including two or more membrane-electrode assemblies; a stack including a bipolar plate provided between the membrane-electrode assemblies; a fuel supplying unit supplying fuel to the stack; and an oxidizer supplying unit supplying an oxidizer to the stack.

A fuel cell is an energy conversion device directly converting chemical energy of fuel into electric energy. In other words, a fuel cell employs a power generation method utilizing a fuel gas and an oxidizer, and using electrons generated during the oxidation and reduction reactions thereof to produce power.

The fuel cell may be prepared through common methods known in the art using the membrane-electrode assembly (MEA) described above. For example, the fuel cell may be prepared by forming with the membrane-electrode assembly (MEA) prepared above and a bipolar plate.

The fuel cell of the present specification is formed including a stack, a fuel supplying unit and an oxidizer supplying unit.

FIG. 3 is a diagram schematically illustrating the fuel cell, and the fuel cell is formed including a stack (60), an oxidizer supplying unit (70) and a fuel supplying unit (80).

The stack (60) includes one or two or more of the membrane-electrode assemblies described above, and when two or more of the membrane-electrode assemblies are included, a separator provided therebetween is included. The separator prevents the membrane-electrode assemblies from being electrically connected, and performs a role of transferring fuel and oxidizer supplied from the outside to the membrane-electrode assemblies.

The oxidizer supplying unit (70) performs a role of supplying an oxidizer to the stack (60). As the oxidizer, oxygen is typically used, and oxygen or air may be injected with a pump (70) to be used.

The fuel supplying unit (80) performs a role supplying fuel to the stack (60), and may be formed with a fuel tank (81) storing fuel, and a pump (82) supplying the fuel stored in the fuel tank (81) to the stack (60). As the fuel, hydrogen or hydrocarbon fuel in a gas or liquid state may be used. Examples of the hydrocarbon fuel may include methanol, ethanol, propanol, butanol or natural gas.

The fuel cell may include a polymer electrolyte fuel cell, a direct liquid fuel cell, a direct methanol fuel cell, a direct formic acid fuel cell, a direct ethanol fuel cell, a direct dimethyl ether fuel cell or the like.

When using the electrolyte membrane according to one embodiment of the present specification as an ion-exchange membrane of the fuel cell, effects described above may be obtained.

In addition, one embodiment of the present specification provides a redox flow battery including a positive electrode cell including a positive electrode and a positive electrode liquid electrolyte; a negative electrode cell including a negative electrode and a negative electrode liquid electrolyte; and the polymer electrolyte membrane according to one embodiment of the present specification provided between the positive electrode cell and the negative electrode cell.

A redox flow battery (oxidation-reduction flow battery) is a system charged and discharged by active materials included in a liquid electrolyte being oxidized and reduced, and is an electrochemical storage device directly storing chemical energy of the active materials as electric energy. A redox flow battery uses a principle of being charged and discharged from the exchange of electrons occurring when liquid electrolytes including active materials in different oxidation states meet with an ion-exchange membrane in between. A redox flow battery is generally formed with a tank holding a liquid electrolyte, a battery cell where charge and discharge occur, and a circulating pump for circulating the liquid electrolyte between the tank and the battery cell, and a unit cell of the battery cell includes an electrode, an electrolyte and an ion-exchange membrane.

When using the electrolyte membrane according to one embodiment of the present specification as an ion-exchange membrane of the redox flow battery, effects described above may be obtained.

The redox flow battery of the present specification may be prepared using common methods known in the art except that the redox flow battery includes the polymer electrolyte membrane according to one embodiment of the present specification.

As illustrated in FIG. 2, the redox flow battery is divided into a positive electrode cell (32) and a negative electrode cell (33) by an electrolyte membrane (31). The positive electrode cell (32) and the negative electrode cell (33) include a positive electrode and a negative electrode, respectively. The positive electrode cell (32) is connected to a positive electrode tank (10) for supplying and releasing a positive electrode liquid electrolyte (41) through a pipe. The negative electrode cell (33) is also connected to a negative electrode tank (20) for supplying and releasing a negative electrode liquid electrolyte (42) through a pipe. The liquid electrolytes circulate through pumps (11, 21), and through an oxidation/reduction reaction (that is, a redox reaction) changing the oxidation number of ions, charge and discharge occur in the positive electrode and the negative electrode.

Hereinafter, the present specification will be described in detail with reference to examples. However, the examples according to the present specification may be modified to various other forms, and the scope of the present specification is not to be construed as being limited to the examples described below. Examples of the present specification are provided in order to more completely describe the present specification to those having average knowledge in the art.

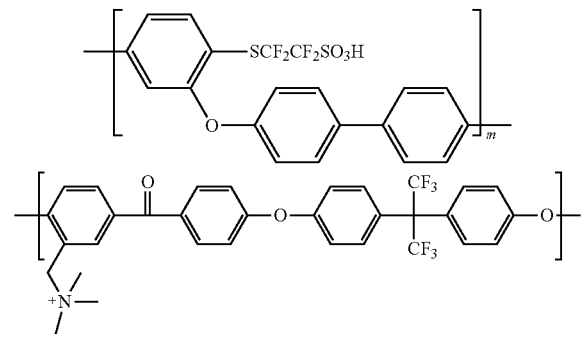

Example 1

A polymer electrolyte membrane was prepared using a polymer including a unit represented by Chemical Formula 1 and a polymer including at least one cationic side chain with the structure shown above.

Comparative Example 1

A polymer electrolyte membrane was prepared in the same manner as in Example 1 except that the polymer including at least one cationic side chain was not used.

Comparative Example 2

A polymer electrolyte membrane was prepared in the same manner as in Example 1 except that the polymer including a unit represented by Chemical Formula 1 was not used.

As for ion conductivity of the film, dependence on humidity was measured using an alternating current impedance method with a four-electrode cell in which temperature and humidity are controlled. After maintaining the cell for 2 hours or longer in a humid section and fully reaching an equilibrium state, ion conductivity was measured.

As for vanadium ion transmittance, the prepared film was placed in a redox flow battery cell and clamped, and while circulating a solution dissolving 1 M magnesium sulfate ($MgSO_4$) in 2 M sulfuric acid ($H_2SO_4$) in a negative electrode and a solution dissolving 1 M vanadium oxysulfate ($VOSO_4$) in 2 M sulfuric acid ($H_2SO_4$) in a positive electrode, a vanadium ion concentration in the negative electrode was measured by the time, and the transmittance was calculated using the following Equation 3.

The vanadium ion concentration was converted by measuring absorbance at a tetravalent ion wavelength of 767 nm using a UV spectrophotometer (Simadzu UV-1650PC).

$$V \frac{dC_t}{dt} = A \frac{P}{L}(C_0 - C_t) \qquad \text{[Equation 1]}$$

In Equation 1,
V means a volume of a sulfuric acid solution,
$C_O$ means an initial vanadium ion concentration in a magnesium sulfate tank,
$C_t$ means a vanadium ion concentration in a magnesium sulfate tank at the time of t,
A means an area of the film in contact with a sulfuric acid solution,
P means vanadium ion transmittance, and
L means a film thickness.

As for an evaluation test condition for an end cell of the redox flow battery, the end cell was evaluated with current density of 50 ma/$cm^2$ in a voltage range of 0.8 V to 1.7 V (SOC 0-100), and herein, a solution dissolving 1 M vanadium in 3 M sulfuric acid was used as a liquid electrolyte, and the amount of the liquid electrolyte used was 50 cc.

Properties of the polymer electrolyte membranes prepared in Example 1 and Comparative Examples 1 and 2, and the results are shown in Table 1.

TABLE 1

| | Comparative Example 1 | Comparative Example 2 | Example 1 |
|---|---|---|---|
| Ion Conductivity (S/cm) | 0.1 | 0.05 | 0.06 |
| Vanadium Ion Transmittance ($\times 10^{-5}$ $cm^2$/min) | 12.3 | 1.1 | 4.89 |
| Coulomb Efficiency (%) | 93.4 | 98.7 | 95.3 |
| Energy Efficiency (%) | 94.7 | 76.6 | 92.7 |
| Voltage Efficiency (%) | 96.6 | 70.3 | 95.3 |

Based on the results of Table 1, it was identified that, in Comparative Example 1 using only a cation polymer, ion conductivity or efficiency was excellent, however, a crossover occurred due to high vanadium ion transmittance, and in Comparative Example 2 using only an anion polymer, it was identified that vanadium ion transmittance was low, however, efficiency was unfavorable.

FIG. 4 is a diagram schematically illustrating vanadium ion migration according to Example 1 and Comparative Example 1. As seen in FIG. 4, it was identified that the redox flow battery including only the polymer including a unit represented by Chemical Formula 1 had a vanadium ion crossover through the membrane. In comparison, it was identified that the redox flow battery including the polymer including a unit represented by Chemical Formula 1 and the polymer including at least one cationic side chain of the present disclosure had a suppressed vanadium ion crossover by a Donnan effect.

In comparison, it was identified that the polymer electrolyte membrane according to one embodiment of the present specification had a reduced crossover due to low vanadium ion transmittance while maintaining high efficiency.

The invention claimed is:

1. A polymer electrolyte membrane comprising:
a polymer including at least one cationic side chain; and
a polymer including a unit represented by the following Chemical Formula 1:

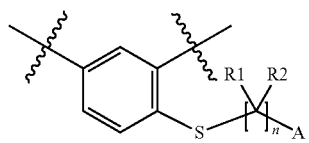

[Chemical Formula 1]

wherein, A is —$SO_3H$, —$SO_3^-M^+$, —COOH, —$COO^-M^+$, —$PO_3H_2$, —$PO_3H^-M^+$, —$PO_3^{2-}2M^+$, —$O(CF_2)_mSO_3H$, —$O(CF_2)_mSO_3^-M^+$, —$O(CF_2)_mCOOH$, —$O(CF_2)_mCOO^-M^+$, —$O(CF_2)_mPO_3H_2$, —$O(CF_2)_mPO_3H^-M^+$ or —$O(CF_2)_mPO_3^{2-}2M^+$;
m is an integer of 1 to 6;
M is a group 1 element;
R1 and R2 are the same as or different from each other, and each independently a halogen group;
n is an integer of 1 to 10; and
when m and n are 2 or greater, two or more structures in the parentheses are the same as or different from each other,
wherein the polymer including at least one cationic side chain includes a unit represented by the following Chemical Formula 2:

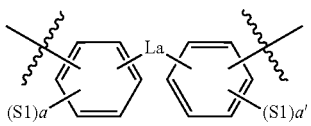

[Chemical Formula 2]

in Chemical Formula 2,
L(a) is CO; $SO_2$; or $C(CF_3)_2$;
S1 and S2 are the same as or different from each other, and each independently hydrogen; deuterium; a halogen group; a nitrile group; a nitro group; a hydroxyl group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted aryl group; a substituted or unsubstituted heterocyclic group; -(L)o-$N^+RR'R''$; -(L)o-$P^+RR'R''$; or the following Chemical Formula 1-A;

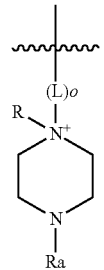

[Chemical Formula 1-A]

in Chemical Formula 1-A,
L is a direct bond; O; NR'''; S; $SO_2$; or a substituted or unsubstituted alkylene group having 1 to 10 carbon atoms;
o is an integer of 1 to 10;
when o is 2 or greater, two or more Ls are the same as or different from each other;
R, R', R'', R''' and Ra are the same as or different from each other, and each independently hydrogen; or a substituted or unsubstituted alkyl group having 1 to 10 carbon atoms;
a and a' are each an integer of 1 to 4; and
when a and a' are each an integer of 2 or greater, two or more structures in the parentheses are the same as or different from each other.

2. The polymer electrolyte membrane of claim 1, wherein the cationic side chain is -(L)o-$N^+RR'R''$; -(L)o-$P^+RR'R''$; or the following Chemical Formula 1-A:

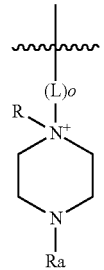

[Chemical Formula 1-A]

wherein, L is a direct bond; O; NR'''; S; $SO_2$; or a substituted or unsubstituted alkylene group having 1 to 10 carbon atoms;
o is an integer of 1 to 10;
when o is 2 or greater, two or more Ls are the same as or different from each other; and
R, R', R'', R''' and Ra are the same as or different from each other, and each independently hydrogen; or a substituted or unsubstituted alkyl group having 1 to 10 carbon atoms.

3. The polymer electrolyte membrane of claim 1, wherein the polymer including at least one cationic side chain further includes a unit derived from a compound represented by the following Chemical Formula 3:

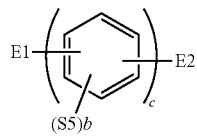

[Chemical Formula 3]

in Chemical Formula 3,

E1 and E2 are a hydroxyl group or a thiol group;

S5 is hydrogen; deuterium; a halogen group; a nitrile group; a nitro group; a hydroxyl group; a substituted or unsubstituted alkyl group; a substituted or unsubstituted cycloalkyl group;

a substituted or unsubstituted alkoxy group; a substituted or unsubstituted alkenyl group; a substituted or unsubstituted silyl group; a substituted or unsubstituted aryl group; a substituted or unsubstituted heterocyclic group; -(L)o-N$^+$RR'R''; -(L)o-P$^+$RR'R''; or the following Chemical Formula 1-A;

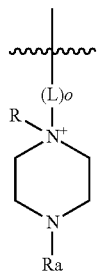

[Chemical Formula 1-A]

in Chemical Formula 1-A,

L is a direct bond; O; NR'''; S; SO$_2$; or a substituted or unsubstituted alkylene group having 1 to 10 carbon atoms;

o is an integer of 1 to 10;

when o is 2 or greater, two or more Ls are the same as or different from each other;

R, R', R'', R''' and Ra are the same as or different from each other, and each independently hydrogen; or a substituted or unsubstituted alkyl group having 1 to 10 carbon atoms;

b is an integer of 1 to 4;

c is an integer of 1 to 3; and when b and c are each an integer of 2 or greater, two or more structures in the parentheses are the same as or different from each other.

4. The polymer electrolyte membrane of claim 1, wherein a first unit represented by Chemical Formula 1 is represented by any one of the following Chemical Formulae 1-1 to 1-9:

[Chemical Formula 1-1]

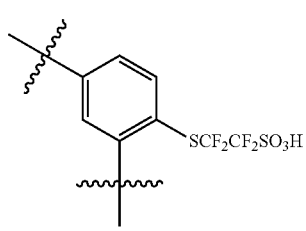

[Chemical Formula 1-2]

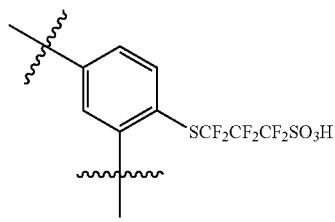

[Chemical Formula 1-3]

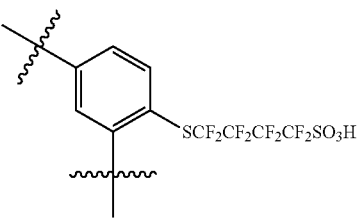

[Chemical Formula 1-4]

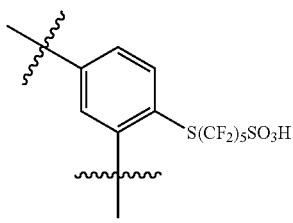

[Chemical Formula 1-5]

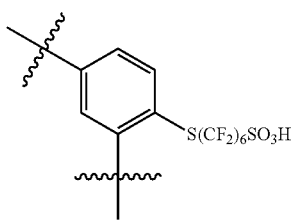

[Chemical Formula 1-6]

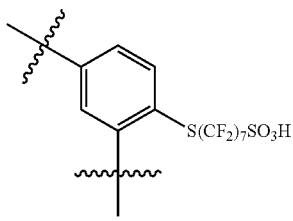

[Chemical Formula 1-7]

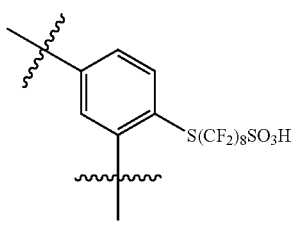

[Chemical Formula 1-8]

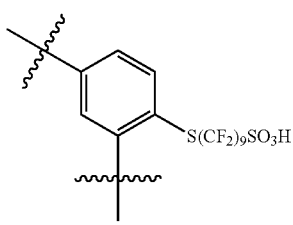

[Chemical Formula 1-9]

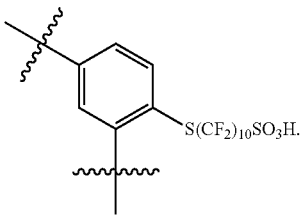

5. The polymer electrolyte membrane of claim 1, wherein the polymer including a unit represented by Chemical Formula 1 includes the unit represented by Chemical Formula 1 in 1 mol % to 100 mol %.

6. The polymer electrolyte membrane of claim 1, wherein the polymer including a unit represented by Chemical Formula 1 is a random polymer.

7. The polymer electrolyte membrane of claim 1, wherein the polymer including a unit represented by Chemical Formula 1 is a block polymer including a hydrophilic block; and a hydrophobic block, and the hydrophilic block includes the unit represented by Chemical Formula 1.

8. The polymer electrolyte membrane of claim 7, wherein the polymer including a unit represented by Chemical Formula 1 includes the hydrophilic block and the hydrophobic block in a molar ratio of 1:0.1 to 1:10.

9. The polymer electrolyte membrane of claim 1, wherein the polymer including a unit represented by Chemical Formula 1 further includes a brancher derived from a compound represented by the following Chemical Formula 4; or a brancher represented by the following Chemical Formula 5:

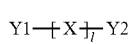
[Chemical Formula 4]

[Chemical Formula 5]

in Chemical Formulae 4 and 5,

X is S; O; CO; SO; $SO_2$; NR""; a hydrocarbon-based or fluorine-based assembly;

l is an integer of 0 to 10;

when l is 2 or greater, two or more Xs are the same as or different from each other;

Y1 and Y2 are the same as or different from each other, and each independently NR""R""; an aromatic ring in which one or two or more are substituted with substituents selected from the group consisting of a hydroxyl group and a halogen group; or an aliphatic ring in which one or two or more are substituted with substituents selected from the group consisting of a hydroxyl group and a halogen group;

R"" is hydrogen; an aromatic ring substituted with a halogen group; or an aliphatic ring substituted with a halogen group; and Z is a trivalent organic group.

10. The polymer electrolyte membrane of claim 1, comprising the polymer including a unit represented by Chemical Formula 1 and the polymer including at least one cationic side chain in a weight ratio of 1:1 to 1:50.

11. The polymer electrolyte membrane of claim 1, which has ion conductivity of greater than or equal to 0.01 S/cm and less than or equal to 0.5 S/cm.

12. The polymer electrolyte membrane of claim 1, which has an ion exchange capacity (IEC) value of 0.01 mmol/g to 5 mmol/g.

13. The polymer electrolyte membrane of claim 1, which has a thickness of 1 μm to 500 μm.

14. The polymer electrolyte membrane of claim 1, which is a reinforced membrane further comprising a substrate.

15. A membrane-electrode assembly comprising:
an anode;
a cathode; and
the polymer electrolyte membrane of claim 1 provided between the anode and the cathode.

16. A polymer electrolyte-type fuel cell comprising:
two or more of the membrane-electrode assemblies of claim 15;
a stack including a bipolar plate provided between the membrane-electrode assemblies;
a fuel supplying unit supplying fuel to the stack; and
an oxidizer supplying unit supplying an oxidizer to the stack.

17. A redox flow battery comprising:
a positive electrode cell including a positive electrode and a positive electrode liquid electrolyte;
a negative electrode cell including a negative electrode and a negative electrode liquid electrolyte; and
the polymer electrolyte membrane of claim 1 provided between the positive electrode cell and the negative electrode cell.

* * * * *